US012632776B2

(12) United States Patent
Chen et al.

(10) Patent No.: US 12,632,776 B2
(45) Date of Patent: May 19, 2026

(54) SYSTEMS AND METHODS FOR RENDERING NEAR-REAL-TIME EMBEDDING MODELS FOR PERSONALIZED NEWS RECOMMENDATIONS

(71) Applicant: Yahoo Ad Tech LLC, New York, NY (US)

(72) Inventors: Peng-Yu Chen, Taipei City (TW); Yu-Ting Chang, Taipei City (TW); Chi-Chia Huang, New Taipei City (TW); Yi-Ting Tsao, New Taipei City (TW); Cheng-En Yen, New Taipei City (TW); Tzu-Chiang Liou, New Taipei City (TW)

(73) Assignee: Yahoo Ad Tech LLC, New York, NY (US)

( * ) Notice: Subject to any disclaimer, the term of this patent is extended or adjusted under 35 U.S.C. 154(b) by 980 days.

(21) Appl. No.: 17/313,698

(22) Filed: May 6, 2021

(65) Prior Publication Data

US 2022/0374761 A1    Nov. 24, 2022

(51) Int. Cl.
*G06N 20/00*        (2019.01)
*G06N 5/02*        (2023.01)

(52) U.S. Cl.
CPC .............. *G06N 20/00* (2019.01); *G06N 5/02* (2013.01)

(58) Field of Classification Search
CPC ................................. G06N 20/00; G06N 5/02
See application file for complete search history.

(56) References Cited

PUBLICATIONS

Lemei Zhang, "A Deep Joint Network for Session-based News Recommendations with Contextual Augmentation", 2018 (Year: 2018).*
Shumpei Okura, "Embedding-based News Recommendation for Millions of Users", 2017 (Year: 2017).*
Nan, "Exploring TD error as a heuristic for σ selection in Q(σ, λ)", 2019 (Year: 2019).*
Wijeratne, "Word Embeddings to Enhance Twitter Gang Member Profile Identification" (Year: 2016).*

* cited by examiner

*Primary Examiner* — Van C Mang
(74) *Attorney, Agent, or Firm* — Bookoff McAndrews, PLLC

(57) ABSTRACT

The instant system and methods solves the cold start problem through various systems and methods directed to aggregating user interaction data associated with a user over a period of time, generating an embedding model based on the aggregated user interaction data, generating a content embedding vector based on the embedding model, generating an embedding profile vector based on the embedding model, storing the embedding profile vector in a storage device, receiving each of the content embedding vector and embedding vector profile for training a ranking model, and generating a predicted list of one or more content items of interest for recommending to the user.

20 Claims, 10 Drawing Sheets

DETECT INTERACTIONS WITH CONTENT ITEMS — 400

IDENTIFY POSITIVE INTERACTIONS — 402

DETERMINE POSITIVE INTERACTION VECTOR — 404

IDENTIFY NEGATIVE INTERACTIONS — 406

DETERMINE NEGATIVE INTERACTION VECTOR — 408

DETERMINE PRIOR USER PROFILE VECTOR — 410

DETERMINE UPDATED USER PROFILE — 412

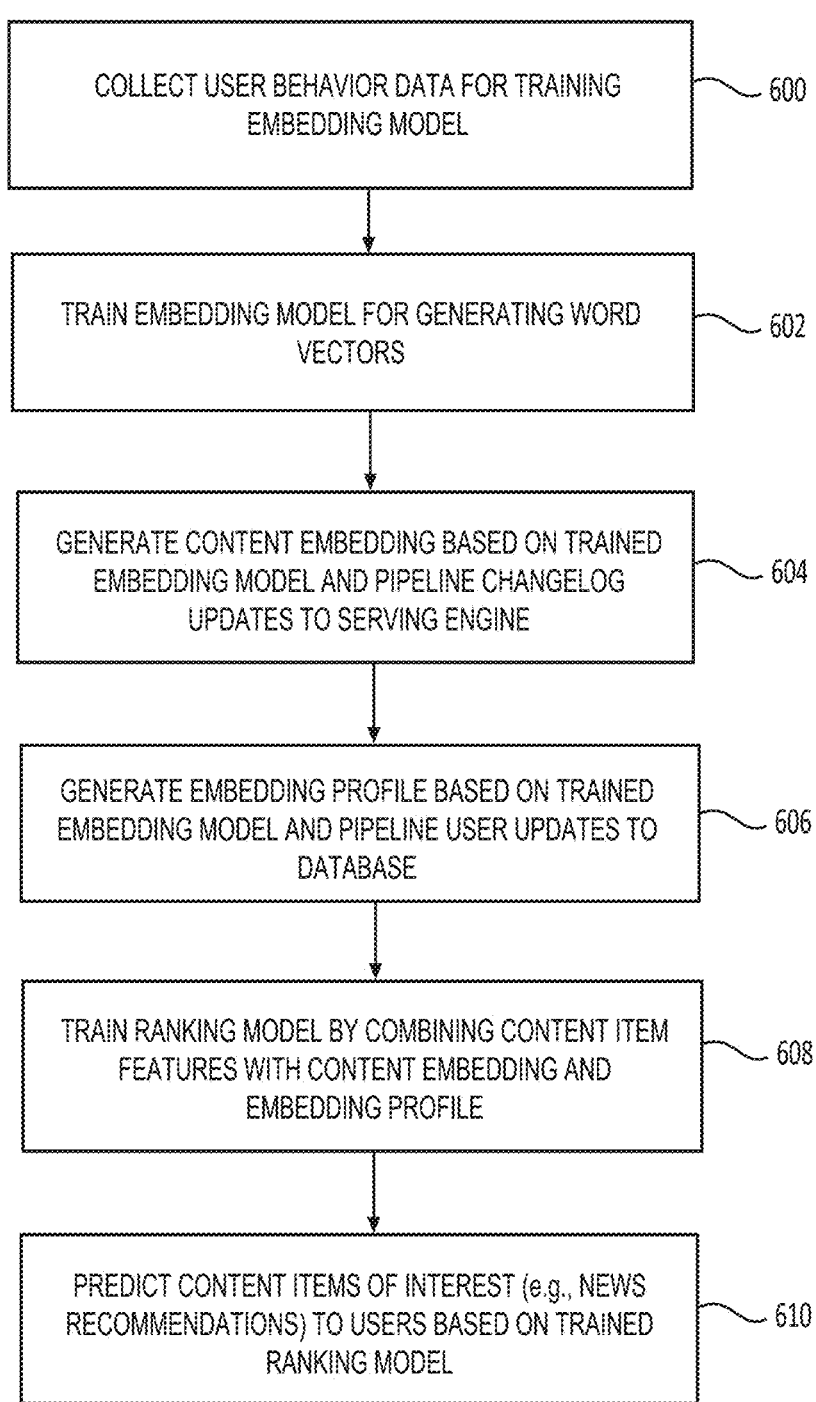

COLLECT USER BEHAVIOR DATA FOR TRAINING EMBEDDING MODEL ⟋ 600

TRAIN EMBEDDING MODEL FOR GENERATING WORD VECTORS ⟋ 602

GENERATE CONTENT EMBEDDING BASED ON TRAINED EMBEDDING MODEL AND PIPELINE CHANGELOG UPDATES TO SERVING ENGINE ⟋ 604

GENERATE EMBEDDING PROFILE BASED ON TRAINED EMBEDDING MODEL AND PIPELINE USER UPDATES TO DATABASE ⟋ 606

TRAIN RANKING MODEL BY COMBINING CONTENT ITEM FEATURES WITH CONTENT EMBEDDING AND EMBEDDING PROFILE ⟋ 608

PREDICT CONTENT ITEMS OF INTEREST (e.g., NEWS RECOMMENDATIONS) TO USERS BASED ON TRAINED RANKING MODEL ⟋ 610

*FIG. 6A*

SYSTEMS AND METHODS FOR RENDERING NEAR-REAL-TIME EMBEDDING MODELS FOR PERSONALIZED NEWS RECOMMENDATIONS

TECHNICAL FIELD

The present disclosure relates to methods and systems for building embedding models and electronic user profiles for generating personalized news recommendations in near-real-time.

BACKGROUND

Online news services have dramatically changed the way people access information. Due to the great number of news sites accessible over the Internet, it can be a challenge for end users to reach desired information as quickly as possible. Users expect to be provided with content that they consider relevant, useful, and/or interesting. Since each user has his/her own set of interests, personalization of presented news results is an important objective for serving end users. The ability to deliver personalized content is crucial to content platforms such as Yahoo!® News, YouTube®, Facebook®, etc. Yahoo! Frontpage®, for example, aggregates news from various sources and provides news articles to users. The platform has gained major popularity with active users ranging in the millions. With the abundance of news information publishing every day through various providers, it can be a challenge for individual users to locate content that they find uniquely interesting.

A key element for providing attractive news to individual users is the temporal concept of immediacy—which generally means that an event has just happened, is currently happening, or is otherwise new to most audience members. Because of the abundance of news information and heavy competition among news providers, publishers are under pressure to provide the latest in news information while balancing users' individualized preferences.

Ranking systems generally utilize phrase-based personalized features to generate news recommendations that are predicted to follow each user's unique preferences. Electronic user profiles generally consist of a bag of phrases or a bag of words (e.g., name entities or features) which are extracted from each user's past online behavior. Yet, it is easy to encounter sparse data because the respective features cannot map two different words with the same semantic meaning. A common approach to avoid sparse data is to utilize embedding-based features. In this way, user interest features are embedded into the vector space and have fixed-length representations. However, existing embedding-based methods traditionally generate in batches. When a batch of new items is introduced, a model may cost a day or longer to retrain. In practice, cold-start problems also make it unsuitable for news recommendation models because of the relatively short lifespans of news articles.

Traditional approaches consist of ranking news articles based on how well they match the user's interests. Determining the interests of a specific user (i.e., building a user profile) is a critical aspect that heavily affects the quality of a news personalization system. While early systems explicitly asked users to specify their profiles, it is common today to develop automated user-profiling strategies that do not require any manual effort on the part of users. One of the most valuable information sources that can be used to automatically build user profiles is the online behavior exhibited by users during their interaction with online services. Also, the behavior exhibited by users may provide clues as to why a particular content item is recommended to them.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

Implementations of the present disclosure provide methods and systems for identifying content to recommend to a user.

In certain implementations, a computer-implemented method is disclosed for identifying content to recommend to a user. The method may comprise aggregating, by a server processor of a computation device, user interaction data associated with a user over a period of time, the user interaction data including one or more user interactions of a first type; generating, by the server processor, an embedding model based on the aggregated user interaction data associated with the user; generating a content embedding vector based on the embedding model, the content embedding vector including a mean pooling of words extracted from one or more content articles; generating an embedding profile vector based on the embedding model, the embedding profile vector including a vector representation of one or more user interaction data of a second type; storing the embedding profile vector in a storage device; receiving, by processor of a serving engine, each of the content embedding vector and embedding vector profile for training a ranking model; and based on the trained ranking model, generating a predicted list of one or more content items of interest for recommending to the user.

In certain implementations, a system is disclosed for identifying content to recommend to a user. The system may comprise one or more processors; and a non-transitory computer readable medium storing instructions that, when executed by the one or more processors, cause the one or more processors to perform a method comprising: aggregating, by a server processor of a computation device, user interaction data associated with a user over a period of time, the user interaction data including one or more user interactions of a first type; generating, by the server processor, an embedding model based on the aggregated user interaction data associated with the user; generating a content embedding vector based on the embedding model, the content embedding vector including a mean pooling of words extracted from one or more content articles; generating an embedding profile vector based on the embedding model, the embedding profile vector including a vector representation of one or more user interaction data of a second type; storing the embedding profile vector in a storage device; receiving, by processor of a serving engine, each of the content embedding vector and embedding vector profile for training a ranking model; and based on the trained ranking model, generating a predicted list of one or more content items of interest for recommending to the user.

In certain implementations, a non-transitory computer-readable medium is disclosed for identifying content to recommend to a user. The non-transitory computer readable medium may store instructions that, when executed by one or more processors, cause the one or more processors to perform a method comprising: aggregating, by a server processor of a computation device, user interaction data associated with a user over a period of time, the user interaction data including one or more user interactions of a first type; generating, by the server processor, an embedding model based on the aggregated user interaction data associated with the user; generating a content embedding vector based on the embedding model, the content embedding vector including a mean pooling of words extracted from one or more content articles; generating an embedding profile vector based on the embedding model, the embedding profile vector including a vector representation of one or more user interaction data of a second type; storing the embedding profile vector in a storage device; receiving, by processor of a serving engine, each of the content embedding vector and embedding vector profile for training a ranking model; and based on the trained ranking model, generating a predicted list of one or more content items of interest for recommending to the user.

Additional objects and advantages of the disclosed implementations will be set forth in part in the description that follows, and in part will be apparent from the description, or may be learned by practice of the disclosed implementations. The objects and advantages of the disclosed implementations will be realized and attained by means of the elements and combinations particularly pointed out in the appended claims.

It is to be understood that both the foregoing general description and the following detailed description are exemplary and explanatory only and are not restrictive of the disclosed implementations, as claimed.

BRIEF DESCRIPTION OF THE DRAWINGS

The accompanying drawings, which are incorporated in and constitute a part of this specification, illustrate various exemplary implementations and together with the description, serve to explain the principles of the disclosed implementations.

FIG. 6A illustrates a method of training embedding models, according to one implementation of the present disclosure.

DETAILED DESCRIPTION

Figure 1A:
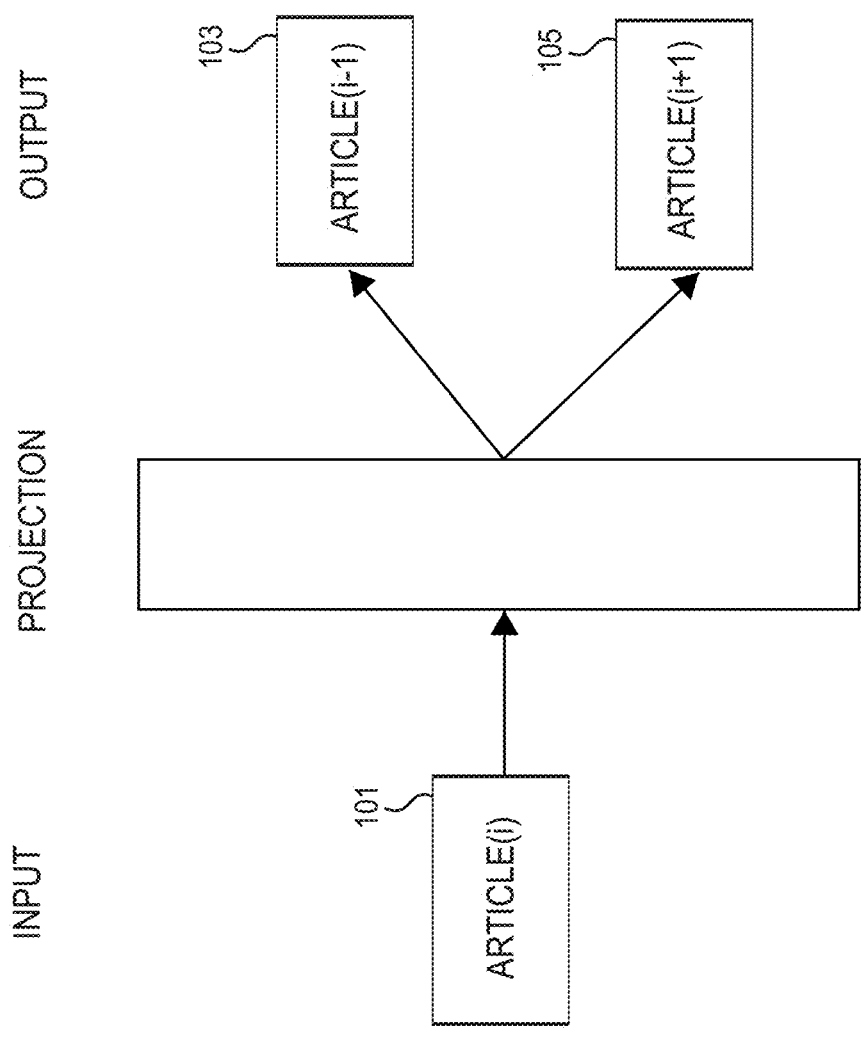
FIG. 1A conceptually illustrates a process for aggregating a user's series of article browsing sessions for embedding model training, according to one implementation of the present disclosure.

The following implementations describe systems and methods for building embedding models and electronic user profiles for generating personalized news recommendations in near-real-time. It will be apparent, however, to one skilled in the art, that the present disclosure may be practiced without some or all of these specific details. In other instances, well known process operations have not been described in detail in order not to unnecessarily obscure the present disclosure.

Subject matter will now be described more fully hereinafter with reference to the accompanying drawings, which form a part hereof, and which show, by way of illustration, specific example implementations. Subject matter may, however, be embodied in a variety of different forms and, therefore, covered or claimed subject matter is intended to be construed as not being limited to any example implementations set forth herein; example implementations are provided merely to be illustrative. Likewise, a reasonably broad scope for claimed or covered subject matter is intended. Among other things, for example, subject matter may be embodied as methods, devices, components, or systems. Accordingly, implementations may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one implementation" as used herein does not necessarily refer to the same implementation and the phrase "in another implementation" as used herein does not necessarily refer to a different implementation. It is intended, for example, that claimed subject matter include combinations of example implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Current ranking systems for news streams generally utilize phrase-based features in electronic user profiles to represent personal preferences. User profiles generally follow a bag-of-words (BoW) model in which features are extracted from text documents that online users previously interacted with. A bag of words is a representation of text that describes the occurrence of words within a document. The model turns arbitrary text into fixed-length vectors by counting how many times each word appears. But a bag of words generally gives rise to sparse data—in which null or zero data is interspersed throughout an important set of data—because the model is unable to map two different words with the same semantic meaning.

One approach to solve the sparsity problem is to instead utilize embedding-based features, in which text features representing user preferences are embedded into the vector space and have a fixed-length representation. The fixed-length vector representation not only solves the sparsity problem but also improves the expressive ability of the model to meaningfully represent categories in the transformed space.

Existing embedding-based methods, however, focus on batch generation which requires a retraining of the model each time a new item is introduced. An embedding-based model can take upwards of a day or longer to retrain depending on the size of the dataset. It is this retraining cost that makes most embedding-based models infeasible for news recommendation systems since they are held to expectations of immediacy in the delivery of the latest news.

Existing embedding-based methods can also result in cold-start problems. News articles have relatively short lifespans and exist in news streams for no more than two to four days (e.g., breaking news or weather forecasting). Because of the shorter lifespans, news recommendations are generally more time sensitive compared to music or movie recommendations. It is therefore crucial for publishers to rely on news article recommendation systems that can quickly identify personalized news articles from the abundance of news information on the Internet.

Implementations of the present disclosure include the generation of embedding models in near-real-time to solve the problems described above. User interest features and news article features share the same embedding space and are transformed into a fixed-length representation vector in near-real-time. The disclosed embedding models solve the cold-start problem and ensure time-sensitive features are more immediately identified in news recommendation systems.

Implementations of the present disclosure include the building of i) an embedding model for use in two vectors, Content Embedding and Embedding Profile, and ii) a ranking model for use in recommendation systems.

Training Embedding Model

For the two vectors, Content Embedding and Embedding Profile, an embedding model is trained. In order to train the embedding model, user behavior data is collected from users' online viewing history. The collection of user behavior data is premised on the idea that articles continuously found in a user's viewing history will remain near each other in a transformed vector space. Therefore, the history of users' article browsing sessions is collected and later used as training data for the embedding model. An article browsing session is defined as a user's series of consecutive clicks on any number of articles within a predefined period of time. In some embodiments, the predefined period of time is within a twenty-four (24) hour period of time. In other embodiments, the predefined period of time is within an eight (8) hour period of time. In yet other embodiments, the predefined period of time is within a four (4) hour of time. In yet other embodiments, the predefined period of time is greater than a twenty-four (24) hour and less than a fortyeight (48) hour period of time. The collected sequences of users' article browsing sessions are later used for training the embedding model.

FIG. 1A conceptually illustrates a process for determining an embedding model according to one implementation of the present disclosure. In the illustrated implementation, training of the embedding model is conducted on a word vector generation model, Word2Vec Skip-Gram model with negative sampling, which aims to predict the source context words (e.g., surrounding articles 103 and 105) given a target word (e.g., center article 101). In some embodiments, one word was randomly picked from every article in the collected history of users' article browsing sessions and used to generate the trained embedding model.

Content Embedding

Once trained, the embedding model is used to generate the first vector, Content Embedding, which serves to generate a mean pooling of the words of an article, as follows in Eq. 1:

$$\text{Content Embedding} = \frac{1}{N}\sum_{i=1}^{N}E_{w_i} \qquad (1)$$

where N is the word count in a sentence of the article, and $E_{w_i}$ represents the embedding vector of each word $w_i$ in the sentence of the article. The first vector, Content Embedding, is thus calculated by averaging the word vector $E_{w_i}$.

Embedding Profile

Content Embedding is then used to generate the second vector, Embedding Profile—a vector representation of a user profile. The user profile representing a user's interest is critical for building personalized recommendation systems. User interest profiles can be built using the features of the content items that a user has interacted with. Examples of content features for news items can be topics of news articles. The feature space of the user profile is then the same as the space of content features, and a given feature value in the user profile indicates the relevance of the content feature to the user. At the time of serving content items to users, the relevance between a user and a given content item can be measured based on the similarity between the user's profile and the content features of the given content item.

One solution to building user profiles is to combine all features of items clicked on by the user during a browsing session. This is based on the assumption that if a user interacts a lot with content items containing a specific feature, that feature may be highly relevant to this user and the user is likely to read other items that contain the feature as well. A user interest profile can then be represented as a vector over content features.

Because immediacy is crucial to certain content providers (e.g., news outlets providing articles with the latest news), it is important to quickly build user profiles that contain discriminative user interest features. Implementations of the present disclosure may model a user's interest by capturing user interactions in the form of tracking clicked items during a browsing session. In other embodiments, user interactions may include both click and skip interactions, which may be registered as positive and negative feedback on items, respectively. More specifically, in some implementations, the history of click or skip feedback for each user on displayed items may be used to construct the training data for that user, where each item may be a feature vector with labels, click or skip. Furthermore, time-decay factors may be taken into account so that the system can keep track of changes in the users' interest. Changes in the feature (topic)

values in the user profile indicate that the relevance of topics to the user is changing. New features (topics) can be added into the user profile, and old topics can also be removed based on the user's interactions with the content items.

The feedback can be explicit, e.g. in the form of ratings or binary preference indicators, or implicit, e.g. inferred from the user's interaction with the content item. As with explicit interest declarations, assuming the presence of explicit feedback is not always feasible. On the other hand, there is a rich set of implicit feedback that can be obtained from the user's behavior in relation to a content item. As an example, a user can indicate a positive preference by clicking on an item or dwelling on it beyond a threshold amount of time. In other embodiments, negative feedback can be inferred/construed from a lack of a click or very low time spent on an item (e.g. less than a threshold amount of time). Given the user feedback on a set of content items, it is possible to characterize or build a profile for the user.

An advantage of building such user interest profiles is that such a method suffers less from the item cold-start case. That is, even if the user is the very first person to interact with that item, it can be deemed relevant to the user based on an overlap in the user interest profile and the item's features. Examples of content features for news items can include topics of the content item. Such profile building methods can be built from a combination of explicit, implicit, positive and/or negative feedback from the user. However, there are also several challenges to building an effective user profile in an expedient manner.

For example, there can be multiple types of user feedback interactions occurring between users and items that go beyond clicks. Users may show interest in a topic in one item while skipping the same topic in other items. In particular, signals that can be considered as negative feedback of the users are of great value, since they improve the discriminative ability of user profiles. Very few content personalization solutions explicitly model the wealth of information in implicit negative feedback from users. Hence, one challenge is how to effectively exploit the complex implicit feedback data for modeling user profiles.

The time-varying nature of a user's interest also presents challenges. A user's interest may change based on contextual information. A user may have different topical interests on weekdays versus weekends. She may change her interest according to seasonal events. To capture users' interests precisely and quickly, implementations of the disclosure consider a time-decay factor.

According to one aspect of the present disclosure, an approach to building user profiles is summarized below. As discussed above, a typical desirable profile model should capture time-varying aspects of user's interests and build user profiles precisely and quickly.

In some embodiments, the Content Embedding model may be used for generating user interest profiles. In this case, the Content Embedding model is used to generate Embedding Profile, which is produced by monitoring the user's series of clicks on the news article stream. In some embodiments, the Embedding Profile at time t is calculated as follows:

$$\text{Profile}(t) = \text{Profile}(t-1)*\alpha + \text{Embedding}*(1-\alpha) \qquad (2)$$

where Embedding is the Content Embedding of a new click a time t, which is then summed with a user's past Embedding Profile at time t−1.

Embedding Profile is multiplied by a time-decay factor $\alpha$, which controls the rate so that past interactions decrease in value over time. Time-decay factors are taken into account so that the system can keep track of changes in the users' interest. The time-decay factors are chosen heuristically and are set as a hyperparameter in the model. In some embodiments, the time-decay $\alpha$ has a value between zero and one, and determines the extent to which the previous user profile vector influences the current user profile vector. Furthermore, by setting the parameter $\alpha$ to a value between zero and 1, the parameter $\alpha$ also controls the decay of the influence of a previous user profile vector for purposes of determining a current user profile vector. That is, as the parameter $\alpha$ decreases, so the influence of the previous profile vector is not only reduced for purposes of determining the updated profile vector, but also increases the rate of decay of the previous profile vector's influence in subsequent profile updates. There is an exponential decay of the previous user profile vector that is defined by parameter $\alpha$.

In various implementations, the time period t can define any period of time, including by way of example and without limitation, one or more days, one or more weeks, one or more months, etc. It will be appreciated that the time period defines how often the user profile is updated. In some implementations, the time period t is defined by recording of a predefined number of interactions (positive or negative) with content items. In this manner, then the user profile is not updated until a sufficient number of interactions has been recorded since the last time the user profile was updated.

In some embodiments, the user interactions may include tracking of the items clicked on by a user during a browsing session. In other embodiments, user interactions may include tracking both clicks and skips during a browsing session. While implementations have been described with reference to clicks and skips as types of positive and negative interactions, it will be appreciated that in other implementations, positive interactions may include any type of interaction with a content item that indicates its relevance to the user, and negative interactions may include any type of interaction with a content item that indicates its non-relevance to the user. In some implementations, positive interactions include dwell time (time spent by a user viewing a given content item) greater than (or equal to) a predefined threshold. In other implementations, negative interactions may include dwell time less than (or equal to) a predefined threshold. Other examples of positive interactions can include social signals such as commenting on a content item, sharing of a content item (e.g. over a social network), indicating a reaction to a content item on a social network (e.g. thumbs up, like, etc.), and other types of interactions that indicate user engagement with a content item.

It will be appreciated that initially, there may be no previous user profile vector for a brand new user. In this case, then the first user profile vector may be determined by tracking the clicks made by a user during a browsing session within a predetermined period of time. In other embodiments, both clicks and skips made by a user may register as positive and negative interactions, respectively, which then may determine both positive and negative interaction vectors. After this first user profile vector is determined, then it is used to determine a subsequent user profile vector in a subsequent time period, per the above.

In some implementations, the value of time-decay $\alpha$ is in the range of about 0.5 to 0.9; in some implementations, $\alpha$ is in the range of about 0.7 to 0.9; in some implementations, $\alpha$ is approximately 0.8.

Figure 1B:
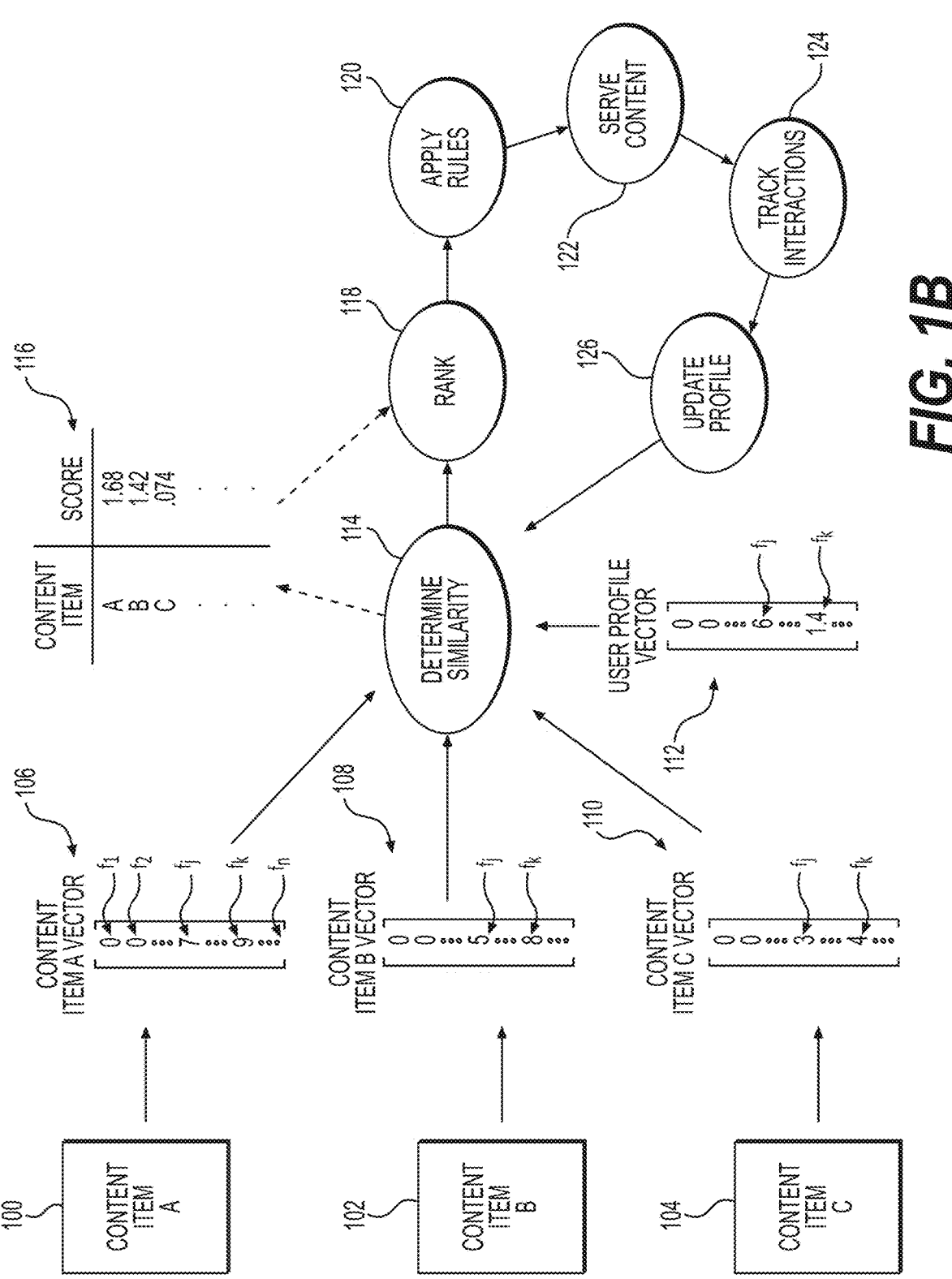
FIG. 1B conceptually illustrates a process for serving content items to a user based on the user's profile, according to one implementation of the present disclosure.

FIG. 1B conceptually illustrates a process for serving content items to a user based on the user's profile, according to one implementation of the present disclosure. Broadly speaking, implementations of the disclosure relate to a content recommendation system that recommends content items to users based on their user profiles, and further updates their user profiles based on both positive and negative feedback on the content items that have been provided to the users. A content item can be any type or unit of electronic content that can be provided over an electronic network, and rendered on a client device operated by the user. Examples of content items include by way of example without limitation, electronic articles (e.g. news, editorials, non-fiction, fiction, etc.) displayed via websites or mobile applications, videos, images, audio, advertisements, and any other type of content that can be transmitted over an electronic network for consumption by an end user. Content items may also include previews of such content, and in some implementations, a given content item and its preview may be used and/or considered interchangeably, as for example, an interaction with a preview of a content item can be considered as an interaction with the content item for purposes of determining/updating the user profile according to one implementation of the present disclosure.

In the illustrated implementation, content items A, B, and C (refs. 100, 102, 104, respectively) are conceptually illustrated. It will be appreciated that there may be any number of content items in various implementations. In a content recommendation system such as a news recommendation system, there can be thousands or even hundreds of thousands of content items, by way of example without limitation. Each content item has an associated content item vector. In the illustrated implementation, the content item A has a content item A vector (ref. 106), the content item B has a content item B vector (ref. 108), the content item C has a content item C vector (ref. 110). A given content item vector defines values indicating the relevance of a given content item to various features. Examples of features include any topics, persons, places, things, events, tags, keywords, etc. That is, features are any subject to which a given content item may be relevant. In some implementations, a corpus of features can be used to define the available features, which are represented by a vector. Examples include, by way of example without limitation, Wikipedia entities, the Yahoo! Content Taxonomy, etc. It will be appreciated that the number of possible entities or features defines the dimensional size of the vector space in which the content items are given vector representations (content item vectors). That is, in some implementations, the dimension of the content item vectors is defined by the number of possible features. There can be any number of possible features in various implementations. In some implementations, the dimension of a given content item vector is greater than one thousand; in some implementations, the dimension of a given content item vector is greater than 100,000. In some implementations, the dimension of a given content item vector is on the order of approximately 400,000.

With continued reference to FIG. 1B, in the illustrated implementation, the content item A vector includes fields for features $f_1$ to $f_n$. The values for a given feature indicates the relevance of the given content item to that given feature (e.g. the extent to which the given content item is "about" the given feature). In some implementations, a value of zero indicates no relevance, and increasingly positive values indicate increasing amounts of relevance. In some implementations, the values for most feature fields is likely to be zero, and therefore, in some implementations, content item vectors are stored in a manner such that only the positive feature values are stored, and the remaining field values need not be specifically stored, as they are known to be zero, which can be determined and/or generated when needed for processing.

In some implementations, the specific vector encoding for a given content item can be determined using machine learning methods. Examples of methods for encoding the vector representations of content items are described, by way of example without limitation, in U.S. patent application Ser. No. 15/471,455, filed Mar. 28, 2017, entitled "Multilabel Learning Via Supervised Joint Embedding of Documents and Labels," the disclosure of which is incorporated by reference herein.

In the illustrated implementation, the content item A vector defines a value of 0.7 for feature $f_j$, and a value of 0.9 for feature $f_k$; the content item B vector defines a value of 0.5 for feature $f_j$, and a value of 0.8 for feature $f_k$; the content item C vector defines a value of 0.3 for feature $f_j$, and a value of 0.4 for feature $f_k$.

For a given user, a user profile vector (ref. 112) is defined, that is encoded in the same vector space as the content item vectors. That is, the user profile vector has the same dimensionality and defines values for the same set of features as the content item vectors. However, the values defined by the user profile vector indicate the relevance of the feature to the given user (or rather, the relative amounts of preference or interest of the user in the various features).

To determine the (expected) relevance of a given content item to the user, the similarity of the content item's vector representation to the user profile vector is determined (ref. 114). In some implementations, this is performed by flattening the content item's vector with the user profile vector to arrive at a relevance score. In the illustrated implementation, the user profile vector (ref. 112) is flattened with each of the content item A/B/C vectors to yield each of the relevance scores for content items A, B and C as shown at ref. 116.

The relevance scores can be used to rank the content items according to relevance to the user. In the illustrated implementation, a higher score indicates greater relevance to the user. Based on the content items' rankings, one or more of the content items are presented to the user (ref. 122), e.g. by transmitting the one or more content items over a network to the client device for rendering thereon. In some implementations, the highest ranking content items are presented to the user. In some implementations, the ranking of the content items is used to determine the order in which the content items are presented to the user. In other embodiments, the ranking of the content items is used to predict whether a user will click a news article or not.

In some implementations, factors in addition to the ranked order of the content items are considered before serving content items. For example, in some implementations, one or more rules are applied (ref. 120), e.g. to affect/alter the rankings or supersede the rankings, before content items are served. By way of example without limitation, there may be a rule to prevent too many content items of a same or similar type (e.g. as determined from their respective vector representations) from being presented at the same time or in rapid succession, a rule to insert a specific content item at a particular location and/or time, etc.

After the selected content items are served to the user, then the user's interactions with the selected content items may be tracked (ref. 124). In some embodiments, the tracked interactions may include clicks made by a user during a browsing session during a predetermined period of time. In other embodiments, the user interactions may include the tracking of both clicks and skips made by a user during a browsing session. For example, the clicks made by a user during a browsing session may be processed as positive feedback, indicating relevance of the content item and its associated entities to the user. The skips made by a user may be processed as negative feedback, indicating non-relevance of the content item and its associated entities to the user. This information can be used to update the user's profile vector (ref. 126), as described in further detail below. It will be appreciated that the updated user profile may then be utilized for subsequent similarity and ranking operations to determine which content items will be served to the user in the future.

Figure 2:
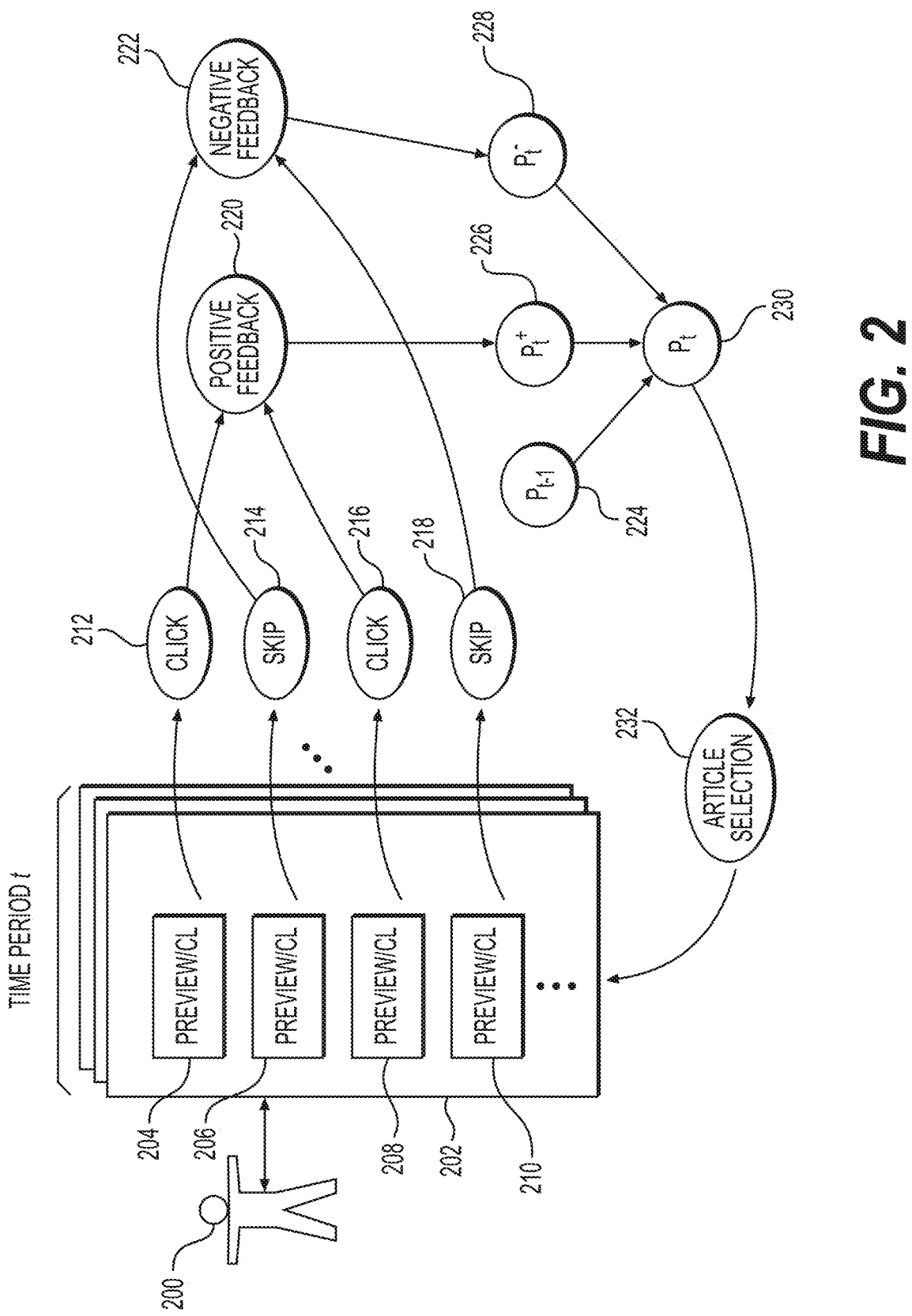
FIG. 2 conceptually illustrates a process for determining a user profile, according to one implementation of the present disclosure.

FIG. 2 conceptually illustrates a process for determining a user profile, according to one implementation of the present disclosure. In the illustrated implementation, the user 200 interacts with content items over a current time period t, that are presented through a content presentation context 202. The content presentation context 202 is any kind of context or vehicle through which the content items can be presented to the user. Examples include, by way of example without limitation, a web page, an application/app, a social media feed, a news feed, etc.

In the illustrated implementation, the user 200 interacts with the content items 204, 206, 208, and 210. As shown, the user clicks on content items 204 and 208. These click interactions (ref. 212 and 216) may be registered as positive feedback/interactions 220 on the content items 204 and 208. In other embodiments, user interactions may include the tracking of skips made by a user during a browsing session. For instance, in FIG. 2, the user skips content items 206 and 210. These skip interactions (ref. 214 and 218) may be registered as negative feedback/interactions 222 on the content items 206 and 210.

It will be appreciated that in some implementations, the content items are previews, which when clicked, cause presentation of the full versions of their respective content items.

Figure 3:
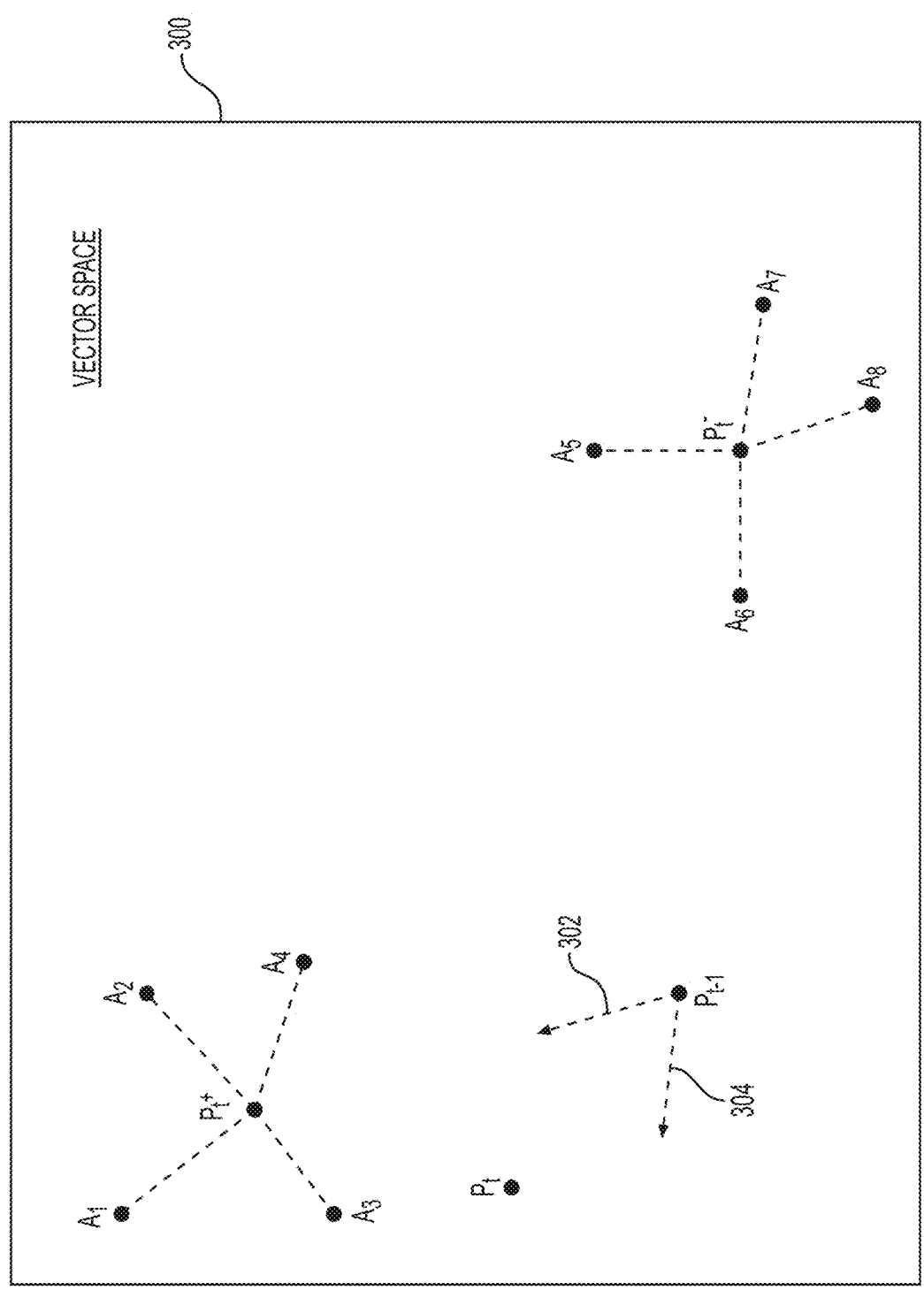
FIG. 3 conceptually illustrates determination of a user profile vector in a vector space, according to one implementation of the present disclosure.

FIG. 3 conceptually illustrates determination of a user profile vector in a vector space, according to one implementation of the present disclosure. In the illustrated implementation, a vector space 300 is shown, in which content item vectors are defined. During a current time period t, a given user may exhibit positive interactions with content items having vector representations A1, A2, A3, and A4, and the given user may exhibit negative interactions with content items having vector representations A5, A6, A7, and A8. The positive interaction vector Pt+ may be determined as the centroid of the content item vectors A1, A2, A3, and A4. The negative interaction vector Pt– is determined as the centroid of the content item vectors A5, A6, A7, and A8.

The user also has a previous user profile vector Pt–1 from a previous time period t–1. In order to update the user profile vector for the current time period t, the previous user profile vector Pt–1, the positive interaction vector Pt+, and the negative interaction vector Pt– may be combined to adjust the user profile vector so that it moves towards the centroid of the content items with which the user exhibited positive interactions (ref. 302), and moves away from the centroid of the content items with which the user exhibited negative interactions (ref. 304), to define the current user profile vector Pt for the current time period.

Figure 4:
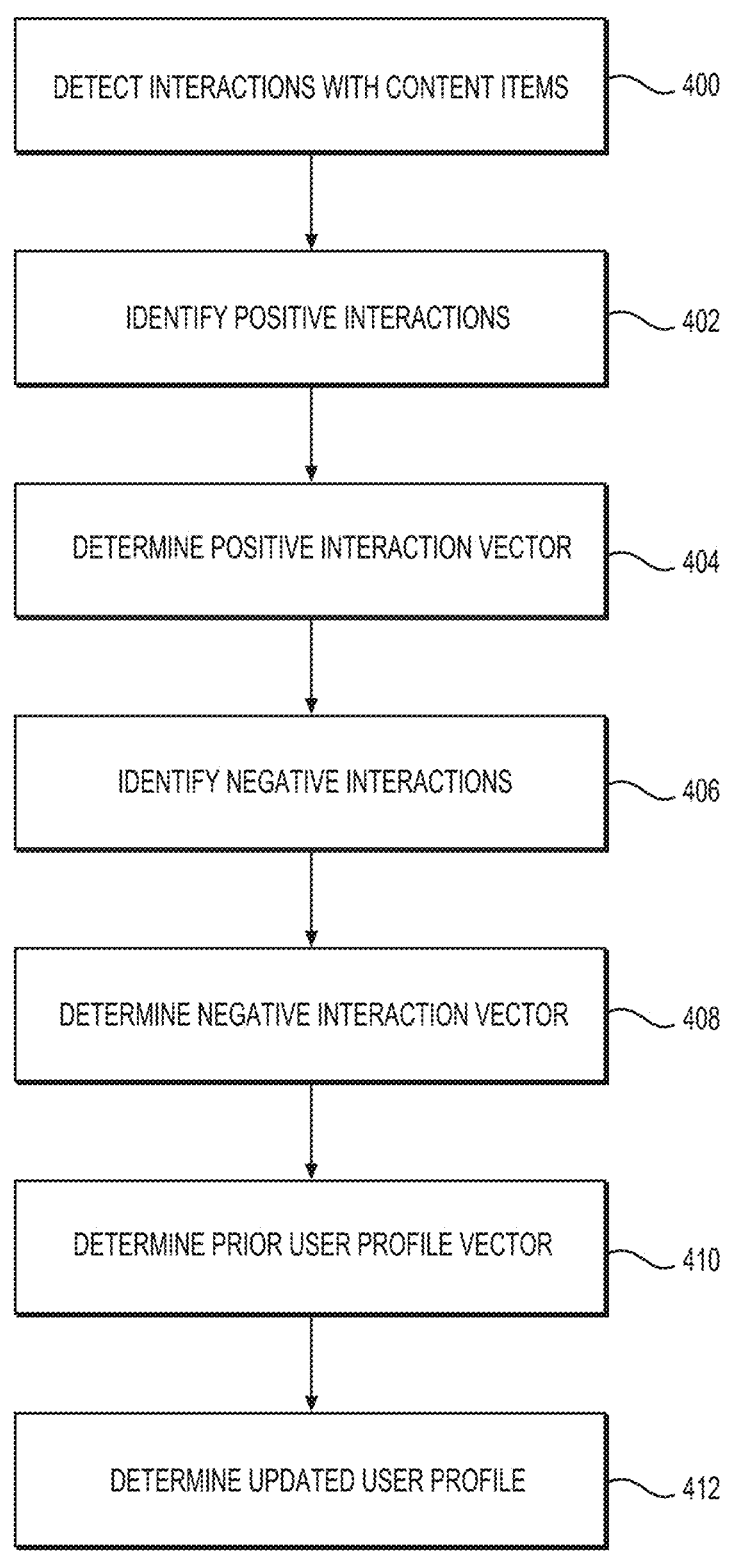
FIG. 4 illustrates a method of updating a user profile, according to one implementation of the present disclosure.

FIG. 4 illustrates a method of updating a user profile, according to one implementation of the present disclosure. At method operation 400, interactions by a user with content items are detected. At method operation 402, positive interactions with content items are identified by tracking the clicks made by a user during a browsing session. At method operation 404, a positive interaction vector may be determined from the identified positive interactions. At method operation 406, negative interactions with content items are identified by tracking the skips made by a user during a browsing session. At method operation 408, a negative interaction vector may be determined from the identified negative interactions. It is to be appreciated that while method operation 400 includes the tracking of both positive and negative interactions, a person skilled in the art may benefit by tracking only the clicks (and not the skips) made by a user during a browsing session. With this alternate implementation, method operation 404 would bypass method operations 406 and 408 and proceed with method operation 410. At method operation 410, a prior user profile vector may be determined, the prior user profile vector being determined from a preceding time period. At method operation 412, an updated user profile vector may then be determined using the prior user profile vector, the positive interaction vector, and the negative interaction vector. In alternate implementations in which only clicks made by a user are tracked, an updated user profile vector may be determined using the prior user profile vector and the positive interaction vector.

Recommendation Task

In building the second embedding model, the embedding-based features are used to construct the ranking model for the recommendation task. The problem is defined as a click classification problem: given a user's click history and a candidate news article, the ranking model predicts whether or not the user will click on the news article. The objective function used in the ranking model is the negative log-likelihood function defined as follows:

$$L = -\frac{1}{N} \sum_{i=1}^{N} (y_i \log \tilde{y}_i) + (1 - \tilde{y}_i)\log(1 - \tilde{y}_i) \tag{3}$$

in which a training set is of size N, with $\widetilde{y}_i$ as the prediction score of the ranking model and $y_i \in 0,1$ as the label representing whether the sample news article i is being clicked on, or whether the sample news article i is being skipped over. At the time of inference, the ranking model determines whether to recommend a news article based on the probability that a user will click on it. The ranking model thus generates a list of news articles to recommend to the user based on the ranking model's prediction score.

Figure 5A:
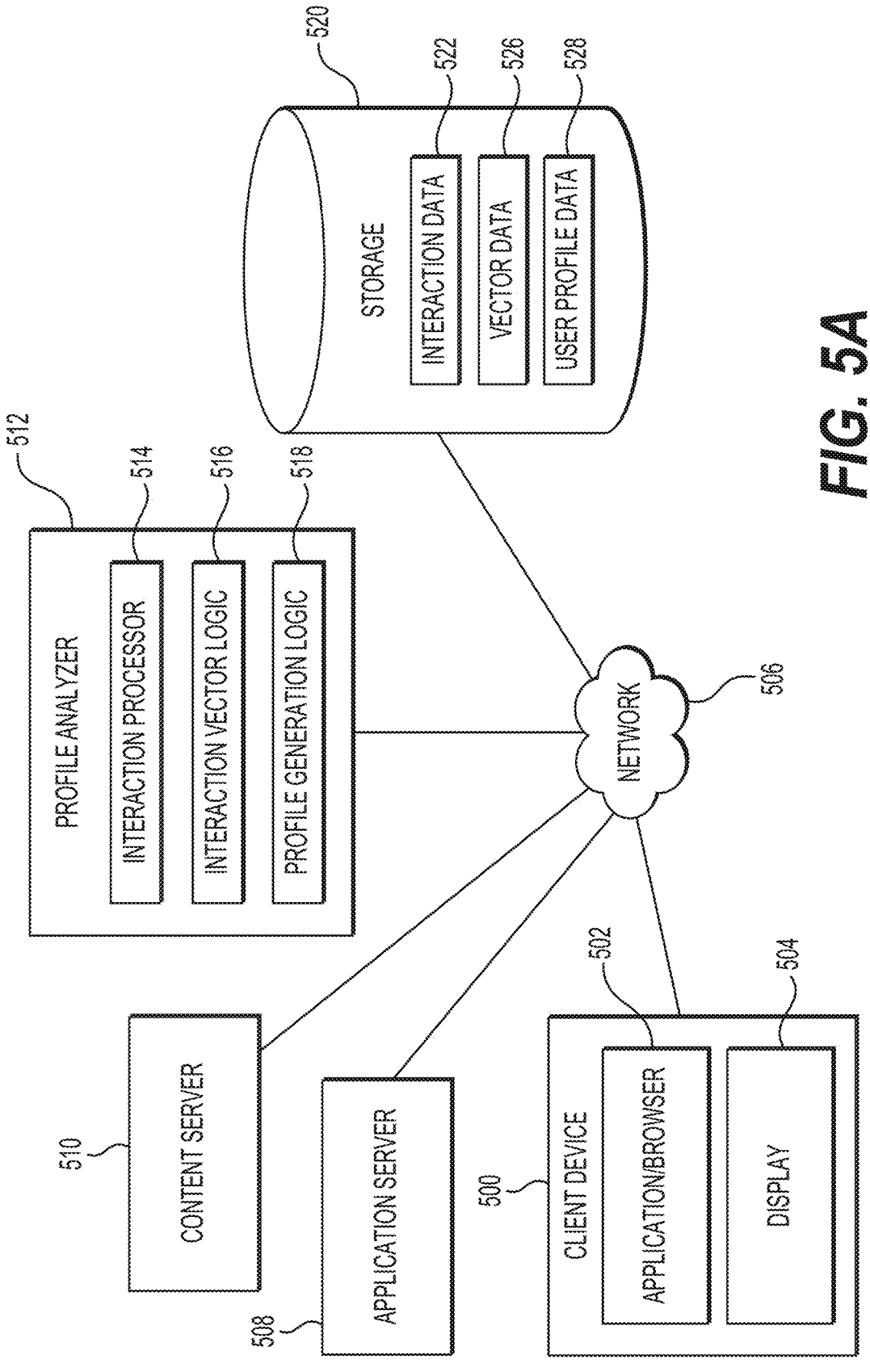
FIG. 5A illustrates a system for providing content to users based on user profiles, according to one implementation of the present disclosure.

FIG. 5A illustrates a system for providing content to users based on user profiles, according to one implementation of the present disclosure. Broadly speaking, the system can be configured to perform any of the methods for generating and using user profiles to provide content over a network described in accordance with implementations of the present disclosure. A client device 500 is operated by a user to access a content site or platform, which in various implementations may be a social content/networking/sharing site, an e-commerce site, a news site, forum site, blogging site, etc. The client device 500 executes an application 502 (which in some implementations, may be a browser application or a web application) that is configured to render to the display 504 of the client device 500 an interface for interacting with the content site. The application 502 may communicate over a network 506 (e.g. the Internet) with an application server 508 to obtain data so that the user may access the content site, including accessing specific content, topics/categories, a personalized feed, etc.

It will be appreciated that in some implementations, content can be obtained from a separate content server 510 for rendering in the context of the interface that is rendered on the client device 500. For example, a preview of a piece of content (e.g. an article from a third-party news source) may be provided, and accessing the article may redirect to obtain the full content from the content server 510 (e.g. the content server of the third-party news source).

A profile analyzer 512 is configured to determine user profiles in accordance with the methods disclosed herein. The profile analyzer 512 includes interaction processor 514 that is configured to process user interactions with content, stored as interaction data 522 in storage 520. In some embodiments, the user interactions may include the tracking of clicks made by a user during a browsing session within a predetermined period of time. In other embodiments, the user interactions may include the tracking of both clicks and skips made by a user to identify positive and negative interactions in accordance with the methods described above.

The profile analyzer 512 further includes interaction vector logic 516 that is configured to process the positive and negative interactions to determine positive and negative interaction vectors, as described above. In other embodiments, the interaction vector logic 516 may be configured to process only the positive interactions (e.g., clicks made by a user during a browsing session) to determine only positive interaction vectors. As has been described, this may entail processing content item vectors, which are stored as vector data 526. The resulting vector representations of the positive and negative interactions can also be stored as part of vector data 526. In other embodiments, the resulting vector representation may only be representative of the positive interactions determined by the user clicks made during a browsing session. The profile analyzer 512 further includes profile generation logic 518 that is configured to generate user profiles in accordance with implementations described above. The user profiles thus defined can be stored as user profile data 528.

Figure 5B:
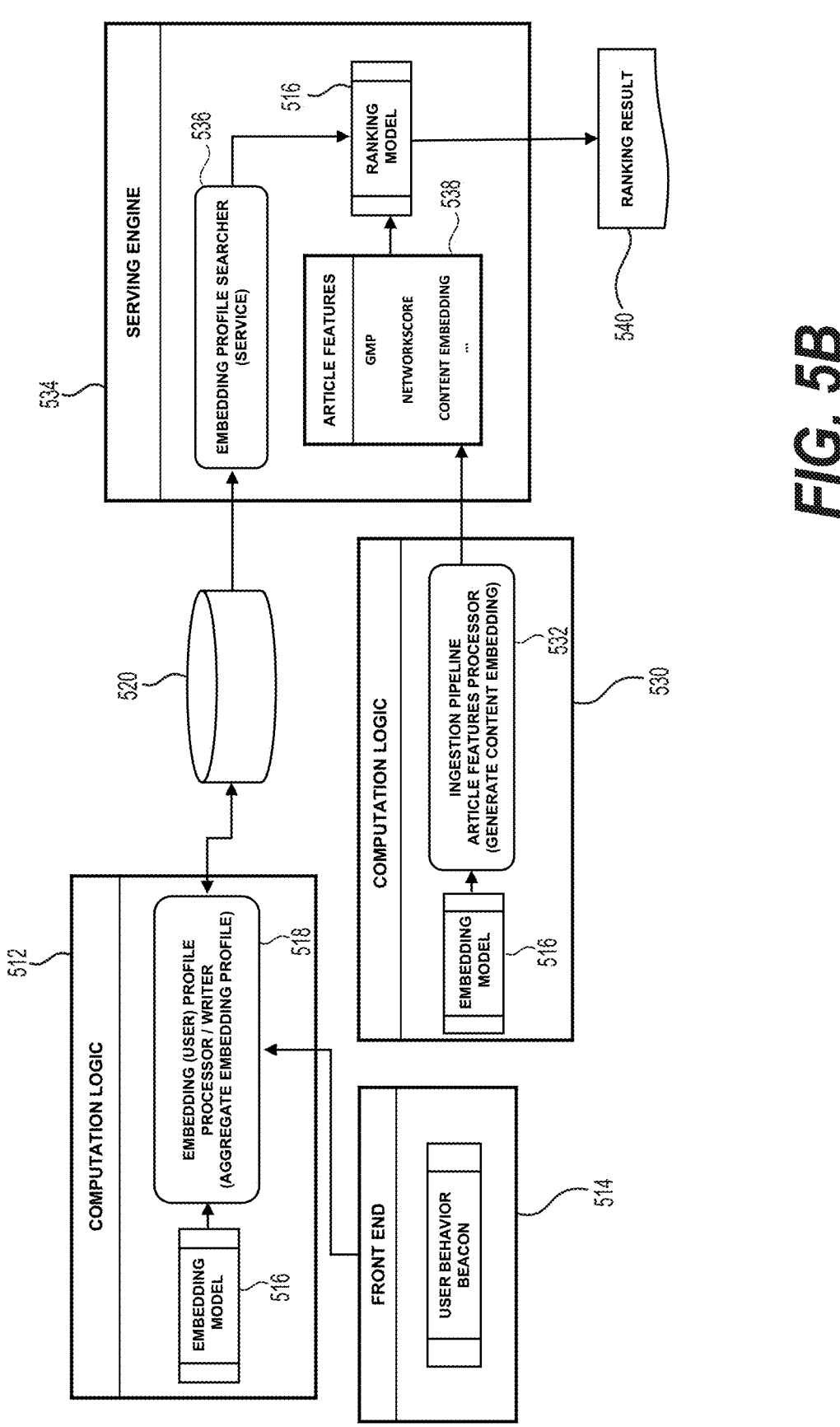
FIG. 5B illustrates a system based on embedding models, according to one implementation of the present disclosure.

FIG. 5B illustrates an expansion of the system for providing content to users based on user profiles and content embedding models, according to another implementation of the present disclosure. In general, the system can be configured to perform any of the methods for generating and using embedding models and user profiles to provide content over a network described in accordance with implementations of the present disclosure. A profile analyzer 512 includes computation logic configured to transform articles (e.g., news articles) into Content Embeddings in accordance with the methods disclosed herein. In some embodiments, the profile analyzer 512 may comprise a wrapper that uses a distributed real-time computation system for processing real-time computation works. The interaction vector logic 516 includes an embedding model that is trained from the aggregate sequences of user browser sessions. The interaction vector logic 516 or embedding model is then used to generate Content Embeddings 532 in an ingestion pipeline 530. The ingestion pipeline 530 is configured to consume articles' changelog and update articles' Content Embedding 532 with embedding model 516. The articles are then fed to serving engine 534 for recommendation.

An interaction processor 514 is configured to consume users' real-time series of interactions in online news streams. The embedding model 516 is then used to transform the users' real-time interactions into an Embedding Profile 518 for each respective user. The user's Embedding Profile 518 is then updated by aggregating embedding features along with users' previous Embedding Profile and a decay function. The Embedding Profile 518 is then stored in database 520. In some embodiments, database 520 may be a NoSQL database.

The serving engine 534 includes embedding profile searcher 536 that is a service configured to read Embedding Profile 518 from database 520. A ranking model 516 is configured to combine Embedding Profile 518 and Content Embedding 532 with other articles' features 538 in order to generate a ranking result 540. In some embodiments, the ranking result 540 may be a list of target articles that are predicted to be clicked on by respective users.

It will be appreciated that the Embedding Profile 518 and Content Embedding 532 can be used by serving engine 534 to recommend content in response to a user request, such as a search query or a request to view a given webpage. In some implementations, this may entail ranking content or results based on a given user's user profile to determine the order in which such content will be presented to the user.

FIG. 6A illustrates a method of predicting content items of interest, according to one implementation of the present disclosure. At method operation 600, user behavior data is collected for training an embedding model. At method operation 602, an embedding model is trained for generating word vectors. At method operation 604, content embeddings are generated based on the trained embedding model and are updated with article changelogs prior to sending to a serving engine. At method operation 606, an embedding profile is generated based on the trained embedding model and is provided along with user updates to a database for storing. At method operation 608, a ranking model is trained by combining content item features with both Content Embedding and Embedding Profile. At method 610, content items that are of interest to users are predicted based on the trained ranking model.

Figure 6B:
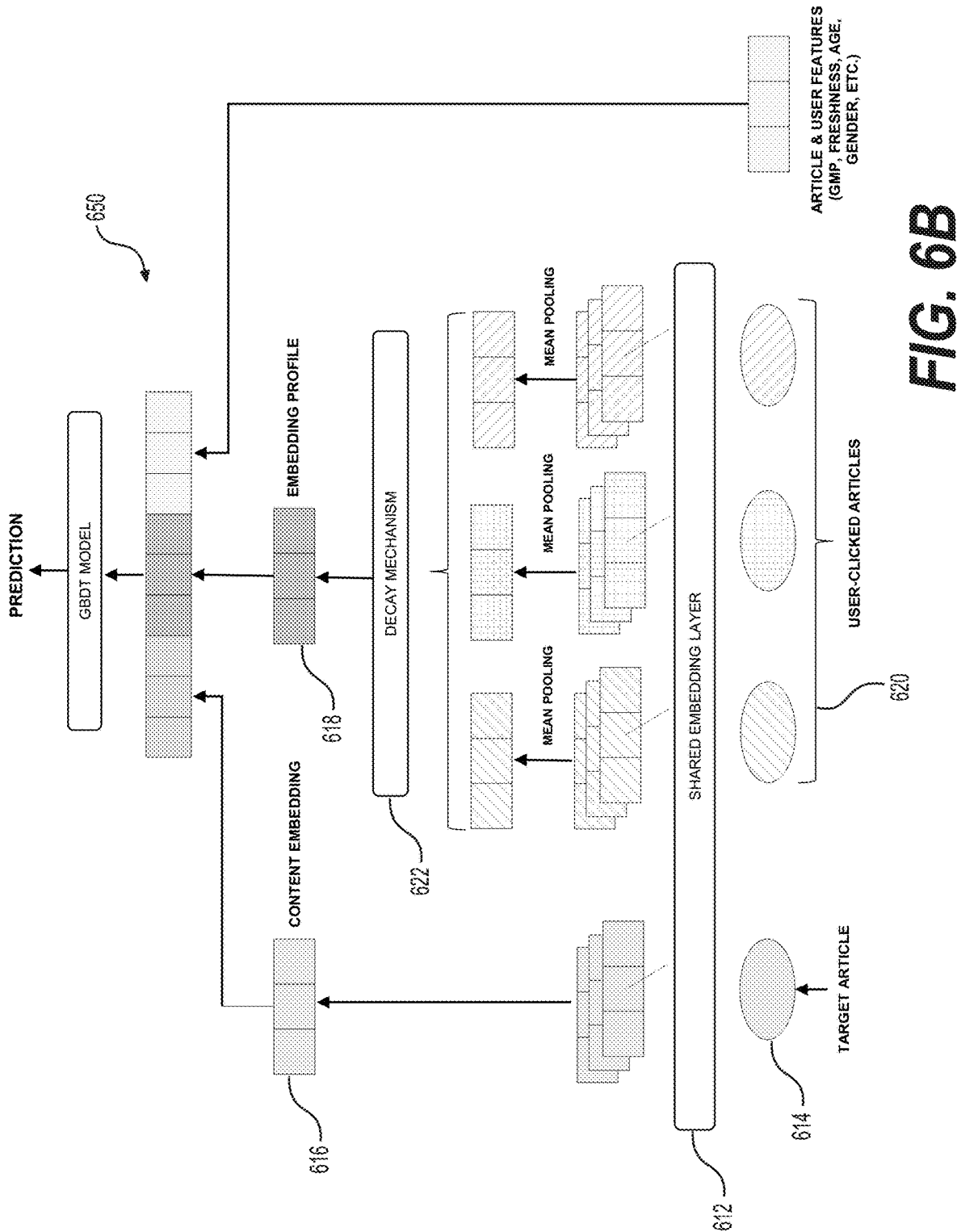
FIG. 6B illustrates a model of training embedding models, according to another implementation of the present disclosure.

FIG. 6B illustrates a model for predicting articles of interest to users, according to one implementation of the present disclosure. In prediction model 650, a shared embedding layer 612 uses the Word2Vec method to transform news articles 614 into Content Embeddings 616. And for each user, an Embedding Profile 618 is generated based on the respective user's past click records 620, while factoring in a time-decay mechanism 622. For each (user, target article) pair, the prediction model 650 concatenates the embedding-based features to predict whether a user will click on a target article or not.

In some implementations, Gradient Boosting Decision Tree (GBDT) is the algorithm used in the recommendation system. GBDT is a machine learning model for regression, classification, and other ranking problems. Boosting is a method of obtaining a strong learner by combining a group of weak learners and reducing the residual in the iteration. GBDT produces a prediction model based on an ensemble of weak decision trees and has been widely used with reliable performance. Unlike alternative learners, GBDT does not require interactions, inherently performs feature selection, and generally prevents overfitting.

In accordance with various implementations of the present disclosure, a near-real-time embedding-based framework, which includes Content Embedding and Embedding Profile, solves both the cold-start problem of existing embedding-based approaches and the sparsity problem of phrase-based user profiles. A feature pipeline was implemented to generate the near-real-time embedding-based user profile aggregated from Content Embeddings. By using these embedding-based features for the recommendation tasks, the immediacy problem was solved and captured more precise syntactic and semantic word representations. With extensive experiments on real-world data and A/B tests on actual news streams (e.g., such as the UK Yahoo!Frontpage Stream), the experimental results demonstrate a 6.3% improvement in offline experiments and a 15.2% improvement in online A/B tests compared with the current one in production.

Some frequently used symbols in this disclosure are described in Table 1 below.

TABLE 1

Features in Production Model

| Feature Name | Feature Description |
| --- | --- |
| GMP | Popularity score of each article from Yahoo! Frontpage |
| networkScore | Popularity score cross Yahoo! Site |
| Freshness | Article's freshness level |
| inferredScore | Personalization score based on phrase-based features |
| gender | User's gender |
| age | User's age |
| loginStatus | User's login status |
| dayOfWeek | Current Day of week |
| hourOfDay | Current hour of day |
| wordCount | Word count of the article |

An analysis was conducted using the embedding models in accordance with various implementations of the present disclosure. For example, a total of 1,824,658 English news articles were collected and from Yahoo! and each were transformed into Content Embeddings. Then some news articles were chosen as targets and used cosine similarity to find the top three news articles that were most similar to each target news article. The target examples are shown below in Table 2, in which the use of Content Embedding results in an excellent ability to find similar news articles in the News, Sports, and Entertainment categories. Not only does the use of Content Embeddings solve the sparsity problem of phrased-based features, but they prove to be very useful in classification models as well as content recommendation models.

TABLE 2

Examples of Related Content

| Target | Putin attends naval parade promises new ships to navy |
| --- | --- |
| | 1. Taliban talks in sight as Afghan political rivals end feud |
| | 2. Russia holds grand WWII parade ahead of vote on Putin reforms |
| | 3. Putin announces state of emergency after massive fuel leak contaminates Arctic river |
| Target | 'The Kissing Booth 3' Filmed in Secret, Will Debut on Netflix in 2021 |
| | 1. Here's where all of the main characters end up on 'Fuller House' |
| | 2. Sony just delayed its big PlayStation 5 reveal at the last minute as protests rage in the US: 'We do not feel that right now is a time for celebration' |
| | 3. As 'The Help' Goes #1 on Netflix, Critics Speak Out and Offer Better Movies to Stream |
| Target | Giants beat Dodgers 3-1, gain split of season-opening series |
| | 1. 5 ways Mets could be impacted by 60-game 2020 MLB season |
| | 2. Futures market: Getting Kennard back on track a priority when (if) Pistons finish off 2019-20 season |
| | 3. Could more MLB players choose to sit out a shortened 50-game season? (podcast) |

Figure 7:
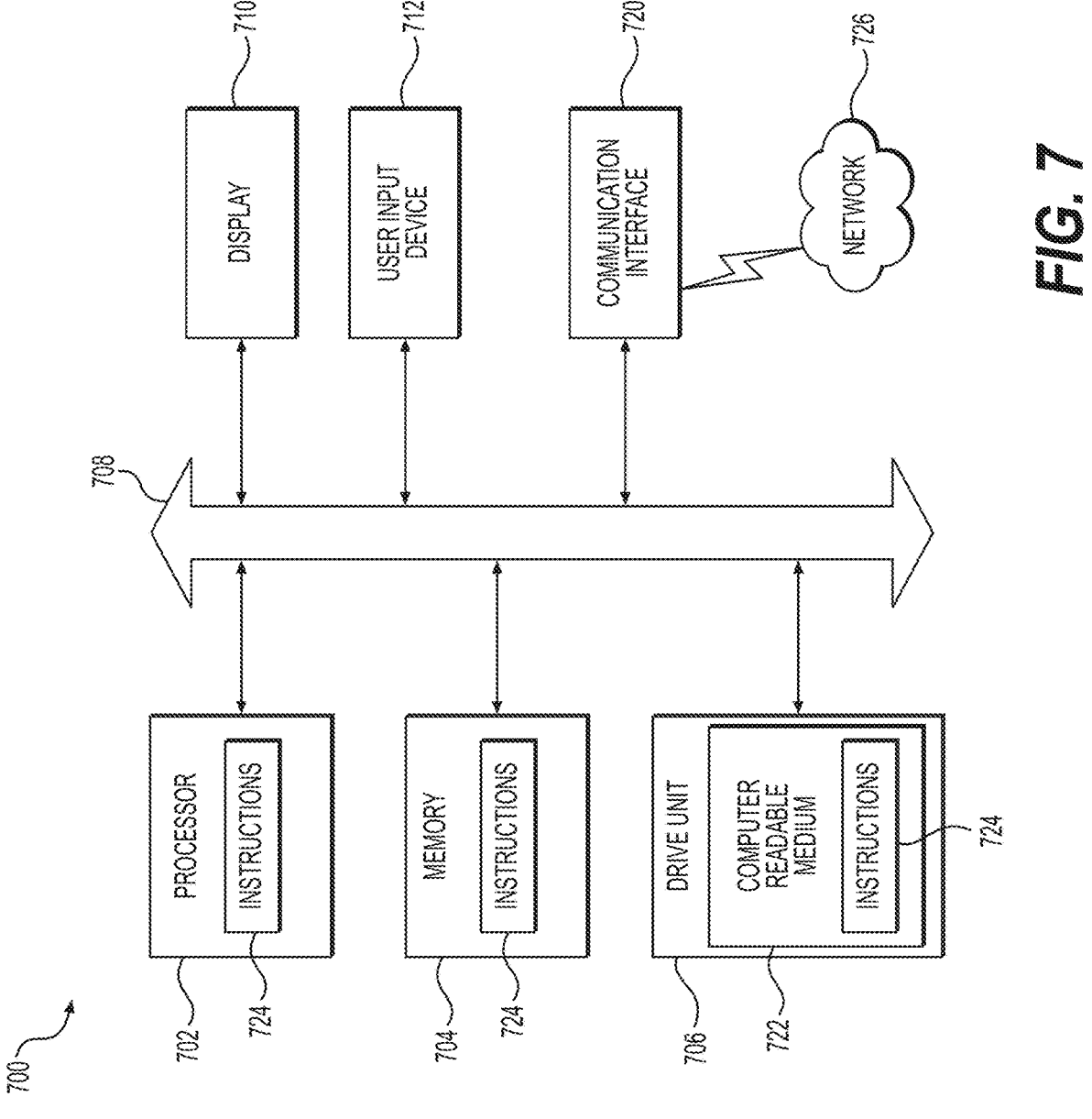
FIG. 7 illustrates an implementation of a general computer system, according to one implementation of the present disclosure.

FIG. 7 illustrates an implementation of a general computer system designated 700. The computer system 700 can include a set of instructions that can be executed to cause the computer system 700 to perform any one or more of the methods or computer based functions disclosed herein. The computer system 700 may operate as a standalone device or may be connected, e.g., using a network, to other computer systems or peripheral devices.

In a networked deployment, the computer system 700 may operate in the capacity of a server or as a client user computer in a server-client user network environment, or as a peer computer system in a peer-to-peer (or distributed) network environment. The computer system 700 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics processing unit (GPU), or both. The processor 702 may be a component in a variety of systems. For example, the processor 702 may be part of a standard personal computer or a workstation. The processor 702 may be one or more general processors, digital signal processors, application specific integrated circuits, field programmable gate arrays, servers, networks, digital circuits, analog circuits, combinations thereof, or other now known or later developed devices for analyzing and processing data. The processor 702 may implement a software program, such as code generated manually (i.e., programmed).

The computer system 700 may include a memory 704 that can communicate via a bus 1008. The memory 704 may be a main memory, a static memory, or a dynamic memory. The memory 704 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 704 includes a cache or random access memory for the processor 702. In alternative implementations, the memory 704 is separate from the processor 702, such as a cache memory of a processor, the system memory, or other memory. The memory 704 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 704 is operable to store instructions executable by the processor 702. The functions, acts or tasks illustrated in the figures or described herein may be performed by the programmed processor 702 executing the instructions stored in the memory 704. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 700 may further include a display unit 710, such as a liquid crystal display (LCD), an organic light emitting diode (OLED), a flat panel display, a solid state display, a cathode ray tube (CRT), a projector, a printer or other now known or later developed display device for outputting determined information. The display 710 may act as an interface for the user to see the functioning of the processor 702, or specifically as an interface with the software stored in the memory 704 or in the drive unit 706.

Additionally or alternatively, the computer system 700 may include an input device 712 configured to allow a user to interact with any of the components of system 700. The input device 712 may be a number pad, a keyboard, or a cursor control device, such as a mouse, or a joystick, touch screen display, remote control or any other device operative to interact with the computer system 700.

The computer system 700 may also or alternatively include a disk or optical drive unit 706. The disk drive unit 706 may include a computer-readable medium 722 in which one or more sets of instructions 724, e.g. software, can be embedded. Further, the instructions 724 may embody one or more of the methods or logic as described herein. The instructions 724 may reside completely or partially within the memory 704 and/or within the processor 702 during execution by the computer system 700. The memory 704 and the processor 702 also may include computer-readable media as discussed above.

In some systems, a computer-readable medium 722 includes instructions 724 or receives and executes instructions 724 responsive to a propagated signal so that a device connected to a network 726 can communicate voice, video, audio, images or any other data over the network 726. Further, the instructions 724 may be transmitted or received over the network 726 via a communication port or interface 720, and/or using a bus 708. The communication port or interface 720 may be a part of the processor 702 or may be a separate component. The communication port 720 may be created in software or may be a physical connection in hardware. The communication port 720 may be configured to connect with a network 726, external media, the display 710, or any other components in system 700, or combinations thereof. The connection with the network 726 may be a physical connection, such as a wired Ethernet connection or may be established wirelessly as discussed below. Likewise, the additional connections with other components of the system 700 may be physical connections or may be established wirelessly. The network 726 may alternatively be directly connected to the bus 708.

While the computer-readable medium 722 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed herein. The computer-readable medium 722 may be non-transitory, and may be tangible.

The computer-readable medium 722 can include a solid-state memory such as a memory card or other package that houses one or more non-volatile read-only memories. The computer-readable medium 722 can be a random access memory or other volatile re-writable memory. Additionally or alternatively, the computer-readable medium 722 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 700 may be connected to one or more networks 726. The network 726 may define one or more networks including wired or wireless networks. The wireless network may be a cellular telephone network, an 802.11, 802.16, 802.20, or WiMax network. Further, such networks may include a public network, such as the Internet, a private network, such as an intranet, or combinations thereof, and may utilize a variety of networking protocols now available or later developed including, but not limited to TCP/IP based networking protocols. The network 726 may include wide area networks (WAN), such as the Internet, local area networks (LAN), campus area networks, metropolitan area networks, a direct connection such as through a Universal Serial Bus (USB) port, or any other networks that may allow for data communication. The network 726 may be configured to couple one computing device to another computing device to enable communication of data between the devices. The network 726 may generally be enabled to employ any form of machine-readable media for communicating information from one device to another. The network 726 may include communication methods by which information may travel between computing devices. The network 726 may be divided into sub-networks. The sub-networks may allow access to all of the other components connected thereto or the sub-networks may restrict access between the components. The network 726 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method for identifying content to recommend to a user, the method comprising:

creating a user interest profile, by a server processor of a computation device, by aggregating user interaction data associated with a user over a period of time, the user interaction data including one or more user interactions of a first type and one or more user interest features;

training, by the server processor, an embedding model to overlap the user interaction data with the one or more user interaction features and embed text features of the one or more user interest features into a vector space with a fixed length representation in order to overcome cold-start problems, the text features including click or skip labels, based on historical click or skip user feedback, and time decay factors to further train the embedding model to remove old text features;

generating, by a machine learning model processed by the server processor, a content embedding vector based on the embedding model, the content embedding vector including a mean pooling of words extracted from one or more content articles;

generating, by the server processor, an embedding profile vector based on the embedding model, the embedding profile vector including a vector representation of one or more user interaction data, the vector representation including the fixed length representation;

training, by the server processor, a machine learning prediction model based on the embedding profile vector and the content embedding vector;

receiving, by the server processor, a user search query;

determining in real-time, by the trained machine learning prediction model and based on the user search query, a predicted list of one or more content items of interest for recommending to the user and a corresponding relevance score for each of the one or more content items of interest; and transmitting, over a network, to a device of the user for display, one of the one or more content items of interest based on the relevance score for each of the one or more content items of interest.

2. The computer-implemented method of claim 1, wherein:

the one or more user interactions of the first type include consecutive clicks of the user on one or more content articles within a predefined period of time.

3. The computer-implemented method of claim 2, wherein:

the predefined period of time includes within a twenty-four hour period of time.

4. The computer-implemented method of claim 1, wherein the embedding profile vector is multiplied by a decay factor, the decay factor configured to decrease a value of one or more past interactions over time.

5. The computer-implemented method of claim 4, wherein the decay factor is selected by a heuristic approach and is set as a hyperparameter.

6. The computer-implemented method of claim 1, wherein the one or more user interaction data of the first type includes: media streaming, search query, menu navigation, electronic messaging, or user application preference setting.

7. The computer-implemented method of claim 1, further comprising generating one or more of: a user recommendation, a user notification, and a user profile customization based on the trained machine learning prediction model.

8. A system for profile partition generation comprising:

at least one processor; and a storage device that stores a set of instructions, the set of instructions being executable by the at least one processor to cause the at least one processor to implement steps comprising:

creating a user interest profile, by a server processor of a computation device, by aggregating user interaction data associated with a user over a period of time, the user interaction data including one or more user interactions of a first type and one or more user interest features;

training, by the server processor, an embedding model to overlap the user interaction data with the one or more user interaction features and embed text features of the one or more interest features into a vector space with a fixed length representation in order to overcome cold-start problems, the text features including click or skip labels, based on historical click or skip user feedback, and time decay factors to
further train the embedding model to remove old text
features;

generating, by a machine learning model processed by
the server processor, a content embedding vector
based on the embedding model, the content embed-
ding vector including a mean pooling of words
extracted from one or more content articles;

generating, by the server processor, an embedding
profile vector based on the embedding model, the
embedding profile vector including a vector repre-
sentation of one or more user interaction data, the
vector representation including the fixed length rep-
resentation;

training, by the server processor, a machine learning
prediction model based on the embedding profile
vector and the content embedding vector;

receiving, by the server processor, a user search query;

determining in real-time, by the trained machine learn-
ing prediction model and based on the user search
query, a predicted list of one or more content items
of interest for recommending to the user and a
corresponding relevance score for each of the one or
more content items of interest; and transmitting, over a network, to a device of the user for
display, one of the one or more content items of
interest based on the relevance score for each of the
one or more content items of interest.

9. The system of claim 8, wherein:

the one or more user interactions of the first type include
consecutive clicks of the user on one or more content
articles within a predefined period of time.

10. The system of claim 9, wherein:

the predefined period of time includes within a twenty-
four hour period of time.

11. The system of claim 8, wherein the embedding profile
vector is multiplied by a decay factor, the decay factor
configured to decrease a value of one or more past interac-
tions over time.

12. The system of claim 11, wherein the decay factor is
selected by a heuristic approach and is set as a hyperparam-
eter.

13. The system of claim 8, wherein the one or more user
interaction data of the first type includes: media streaming,
search query, menu navigation, electronic messaging, or
user application preference setting.

14. The system of claim 8, further comprising:

generating one or more of: a user recommendation, a user
notification, and a user profile customization based on
the trained machine learning prediction model.

15. A non-transitory computer readable medium storing
instructions which, when executed by one or more proces-
sors, cause the one or more processors to perform operations
for profile partition generation, the operations comprising:

creating a user interest profile, by a server processor of a
computation device, by aggregating user interaction
data associated with a user over a period of time, the
user interaction data including one or more user inter-
actions of a first type and one or more user interest
features;

training, by the server processor, an embedding model to
overlap the user interaction data with the one or more
user interaction features and embed text features of the
one or more user interest features into a vector space
with a fixed length representation in order to overcome
cold-start problems, the text features including click or
skip labels, based on historical click or skip user
feedback, and time decay factors to further train the
embedding model to remove old text features;

generating, by a machine learning model processed by the
server processor, a content embedding vector based on
the embedding model, the content embedding vector
including a mean pooling of words extracted from one
or more content articles;

generating, by the server processor, an embedding profile
vector based on the embedding model, the embedding
profile vector including a vector representation of one
or more user interaction data, the vector representation
including the fixed length representation;

training, by the server processor, a machine learning
prediction model based on the embedding profile vector
and the content embedding vector;

receiving, by the server processor, a user search query;

determining in real-time, by the trained machine learning
prediction model and based on the user search query, a
predicted list of one or more content items of interest
for recommending to the user and a corresponding
relevance score for each of the one or more content
items of interest; and transmitting, over a network, to a device of the user for
display, one of the one or more content items of interest
based on the relevance score for each of the one or
more content items of interest.

16. The non-transitory computer readable medium of
claim 15, wherein:

the one or more user interactions of the first type include
consecutive clicks of the user on one or more content
articles within a predefined period of time.

17. The non-transitory computer readable medium of
claim 16, wherein:

the predefined period of time includes within a twenty-
four hour period of time.

18. The non-transitory computer readable medium of
claim 15, wherein the embedding profile vector is multiplied
by a decay factor, the decay factor configured to decrease a
value of one or more past interactions over time.

19. The non-transitory computer readable medium of
claim 15, wherein the one or more user interaction data of
the first type includes: media streaming, search query, menu
navigation, electronic messaging, or user application pref-
erence setting.

20. The non-transitory computer readable medium of
claim 15, further comprising:

generating one or more of: a user recommendation, a user
notification, and a user profile customization based on
the trained machine learning prediction model.

* * * * *